United States Patent
Schmidt

(10) Patent No.: US 9,495,136 B2
(45) Date of Patent: Nov. 15, 2016

(54) USING ALIASING INFORMATION FOR DYNAMIC BINARY OPTIMIZATION

(75) Inventor: William J. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 13/016,038

(22) Filed: Jan. 28, 2011

(65) Prior Publication Data

US 2012/0198428 A1     Aug. 2, 2012

(51) Int. Cl.
*G06F 9/45*     (2006.01)
*G06F 9/455*    (2006.01)
*G06F 9/30*     (2006.01)

(52) U.S. Cl.
CPC ........... *G06F 8/443* (2013.01); *G06F 9/30174* (2013.01); *G06F 9/30189* (2013.01)

(58) Field of Classification Search
CPC ...... G06F 8/443; G06F 8/52; G06F 9/30174; G06F 9/30189; G06F 9/45554
See application file for complete search history.

(56) References Cited

U.S. PATENT DOCUMENTS

| | | | |
|---|---|---|---|
| 6,006,220 A * | 12/1999 | Haderle et al. | |
| 6,463,582 B1 * | 10/2002 | Lethin et al. | 717/158 |
| 6,481,007 B1 * | 11/2002 | Iyer et al. | 717/151 |
| 6,665,865 B1 * | 12/2003 | Ruf | 717/157 |
| 6,721,875 B1 * | 4/2004 | McCormick et al. | 712/233 |
| 6,763,452 B1 * | 7/2004 | Hohensee | G06F 9/45554 703/22 |
| 7,047,394 B1 * | 5/2006 | Van Dyke | G06F 9/30167 703/26 |
| 7,228,404 B1 * | 6/2007 | Patel | G06F 9/30174 712/228 |
| 7,260,815 B1 | 8/2007 | Chen et al. | |
| 7,523,298 B2 * | 4/2009 | Gschwind | 712/239 |
| 7,580,914 B2 * | 8/2009 | Wang et al. | 717/149 |
| 7,712,092 B2 * | 5/2010 | Bansal | G06F 8/52 703/26 |
| 7,734,895 B1 * | 6/2010 | Agarwal et al. | 712/13 |
| 8,046,563 B1 * | 10/2011 | Agarwal et al. | 712/13 |
| 8,078,832 B1 * | 12/2011 | Agarwal et al. | 712/13 |
| 8,127,121 B2 * | 2/2012 | Yates, Jr. | G06F 9/30174 712/203 |
| 8,424,082 B2 * | 4/2013 | Chen | G06F 21/53 713/167 |
| 2001/0016903 A1 * | 8/2001 | Tremblay | 712/239 |
| 2002/0147969 A1 * | 10/2002 | Lethin et al. | 717/138 |
| 2002/0196678 A1 * | 12/2002 | Haber et al. | 365/200 |
| 2004/0049667 A1 * | 3/2004 | McCormick et al. | 712/233 |
| 2004/0054992 A1 * | 3/2004 | Nair et al. | 717/138 |
| 2005/0149521 A1 * | 7/2005 | Wang et al. | 707/6 |
| 2005/0155021 A1 * | 7/2005 | DeWitt et al. | 717/130 |

(Continued)

OTHER PUBLICATIONS

Xu et al., Metadata driven memory optimizations in dynamic binary translator, Jun. 2007, 10 pages.*

(Continued)

*Primary Examiner* — Thuy Dao
(74) *Attorney, Agent, or Firm* — Roy W. Truelson

(57) ABSTRACT

A compiler compiles code in a target program for later execution with a dynamic binary optimizer by including aliasing information with the compiled code. When the program is subsequently executed, the dynamic binary optimizer accesses the aliasing information to determine whether certain optimizations can be safely performed. Preferably, the aliasing information includes a memory reference index assigning an index to each memory reference instruction and a may-alias bit matrix indicating, for each memory reference instruction, which other memory reference instructions might reference the same memory location. Aliasing information is preferably used by the optimizer during execution to safely re-order operations.

23 Claims, 7 Drawing Sheets

(56) References Cited

U.S. PATENT DOCUMENTS

| | | | |
|---|---|---|---|
| 2008/0005728 A1* | 1/2008 | Morris | 717/153 |
| 2008/0092128 A1 | 4/2008 | Corry et al. | |
| 2008/0126764 A1 | 5/2008 | Wu et al. | |
| 2009/0150890 A1* | 6/2009 | Yourst | 718/102 |
| 2009/0204785 A1* | 8/2009 | Yates, Jr. | G06F 9/30174 711/205 |
| 2012/0198427 A1* | 8/2012 | Schmidt | 717/151 |

OTHER PUBLICATIONS

Li et al., Dynamic register promotion of stack variables, Mar. 2011, 11 pages.*

V. Bala et al., "Transparent Dynamic Optimization: The Design and Implementation of Dyanamo", Hewlett-Packard Company, Jun. 1999, published on-line at http://www.hpl.hp.com/techreports/1999/HPL-1999-78.pdf.

* cited by examiner

|  Addr | Index |
|---|---|
| . | . |
| . | . |
| . | . |
| 00a7 | 43 |
| 00b2 | 44 |
| . | . |
| . | . |
| . | . |

FIG. 4

|  | 1 | 2 | 3 | 4 | 5 | 6 | . . . |
|---|---|---|---|---|---|---|---|
| 1 | 1 | 0 | 0 | 0 | 1 | 1 | |
| 2 | 0 | 1 | 1 | 0 | 0 | 0 | |
| 3 | 0 | 1 | 1 | 0 | 0 | 1 | . . . |
| 4 | 0 | 0 | 0 | 1 | 0 | 0 | |
| 5 | 1 | 0 | 0 | 0 | 1 | 0 | |
| 6 | 1 | 0 | 1 | 0 | 0 | 1 | |

FIG. 5

USING ALIASING INFORMATION FOR DYNAMIC BINARY OPTIMIZATION

FIELD OF THE INVENTION

The present invention relates to digital data processing, and in particular to dynamic translation, compilation and optimization of computer programming code.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

At the heart of a computer system is one or more central processing units (CPUs), also called processors, which execute instructions stored in the computer's memory. From the standpoint of the computer's hardware, most systems operate in fundamentally the same manner. Processors are capable of performing a defined set of very simple operations, such as arithmetic, logical comparisons, and movement of data from one location to another. But each operation is performed very quickly. Computer program code at multiple levels directs the computer to perform massive numbers of these simple operations, enabling the computer to perform complex tasks. Although the defined set of simple operations is limited, the possible sequences and combinations of such operations which can be specified in the program code are virtually limitless.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. To make computer programs easier to develop, a large and varied set of high-level languages was developed for supporting the creation of computer program code.

High-level languages vary in their characteristics, but all such languages are intended to make it easier for a human to write a program to perform some task. Typically, high-level languages represent operations, fixed values, variables, and other constructs in a manner readily understandable to the human programmer rather than the computer. Such programs are not directly executable by the computer's processor. In order to run on the computer, the programs must first be transformed from a human-readable form (source code) to something executable by the processor of a computer, i.e. to a sequence of instructions directly readable and executable by the processor.

An instruction which is directly readable and executable by the processor (a processor-executable instruction) is a sequence of binary bits in a pre-defined format, each bit position being specific to logic within the processor which reads and decodes it. Combinations of bit values specify an operation or operations to be performed, source or destination of data, branch conditions or destinations, and so forth. The bit sequence formatting and the meaning of the bit combinations defines the "instruction set" of the processor. While the limited set of simple operations performed by any processor is similar to that of another, the instruction set of each processor (i.e., the pre-defined format and meaning of the processor's executable instruction binary bit sequence) is not.

In general, source code is universal and understandable by anyone trained to use the applicable language, while executable code is specific to a particular computer system environment, and can only execute on that computer system or one similarly configured. In particular, the executable code is specific to the processor's instruction set, although it may be specific to other parameters of the computer system as well.

Various techniques exist for transforming the source code in a high-level language to processor-executable instructions in the processor's instruction set. Source code can be "interpreted", meaning that a special program (an "interpreter") takes each source code statement in sequence, and executes a small procedure (i.e., series of instructions in the processor-executable instruction set) corresponding to each source code instruction. Interpreting is useful for some purposes, but it is generally rather inefficient.

Traditionally, for greater execution efficiency, individual portions (modules) of source code are compiled to form modules of processor-executable instructions, which may be linked together to form larger programs (although some programs contain only a single compiled module). These programs are saved in digital media storage in executable form, and may be distributed in that form to other computer systems, or remain on the system in which they were first compiled. In this form they are later executed, usually many times. Compilation is itself a task performed by a special computer program (a compiler), and can take significant time. Often, compilation involves certain optimizations to the executable code which require analysis of the various instruction sequences within the program. Unlike interpreted code, the resultant processor-executable instructions in a compiled module do not necessarily correspond to particular source instructions, and do not necessarily follow the same sequence, although they must produce the same logical output. Since it is expected that such programs will be executed many times, the burden of compilation is spread over many executions. This traditional form of compilation is sometimes referred to as "static compilation".

In recent years, there has been increasing interest in "just-in-time" dynamic compilation or optimization. Like static compilation, "just-in-time" or dynamic compilation/optimization involves the generation of optimized processor-executable instructions. But unlike static compilation, the program's processor-executable instructions are generated during or as part of execution of the program of which the processor-executable instructions are a part (the "target program"). This effectively means that just-in-time or dynamic compilation/optimization is intended to be performed many times, for example, each time the program is executed, or for each user process which executes the program.

Obviously, when compared with traditional static compilation, dynamic compilation/optimization suffers from the drawback that it is performed again each time the program is executed or for each new user process. However, there are various advantages to just-in-time or dynamic compilation/optimization that make it attractive in many circumstances. For example, dynamically compiled code is generated on the system that will execute it, and can be generated from a universal, intermediate level code form (between a high-level source language and a processor-executable form), which facilitates portability of the program. Such an approach is frequently used in the well-known JAVA™ virtual machine environment. Furthermore, additional knowledge available to the system at execution time, such as the exact system configuration, the code modules being used, and the actual pattern of code execution, make it possible to generate more efficient compiled code than can typically be generated using a static compiler. Such additional knowledge is particularly effective in the case of actual code usage patterns, which allow dynamic compilation/optimization to focus on optimizing specific portions of the code.

One form of dynamic compilation is the generation of processor-executable instructions at execution time from previously compiled executable code, generally without use of the original source code. This is known as dynamic binary optimization. Dynamic binary optimization is commonly used to emulate a computer system having a different, often older, instruction set architecture. I.e., an executable computer program which was previously compiled to contain processor-executable instructions in an older instruction set architecture can be recompiled from the previously complied executable code to generate processor-executable instructions in the instruction set of the current processor.

Although dynamic binary optimization is commonly used to support emulation, it has the potential for improving execution efficiency even where the originally compiled executable code is compiled to the same instruction set architecture as that of the current processor. In other words, even though the previously compiled version of the program is fully capable of execution on the current processor without further compilation, optimization or translation, the execution efficiencies which are possible through dynamic binary optimization may in some circumstances justify the additional overhead of dynamically re-compiling the already compiled code. In some cases, these execution efficiencies may be magnified if the instruction set architecture has been enhanced with new features not utilized by the original statically compiled code (which may be quite old). Typically, only selective portions of the previously compiled code will be re-compiled dynamically, because one of the advantages of dynamic compilation is that it can identify "hot spots" (frequently executed code portions) and focus optimization activity on these hot spots.

Dynamic binary optimization could find more widespread acceptance in a variety of computing applications if it could be improved. One way in which conventional dynamic binary optimization falls short of its potential, not necessarily generally recognized, is its inability to perform certain optimizations for lack of aliasing information indicating which program variables are potentially referenced by each of the program's instructions. A compiler which produces executable code directly from source code inherently has aliasing information available to it from the source. Often, this information is also preserved in the intermediate code versions as well. Aliasing information enables the compiler to determine which memory locations are potentially referenced by an instruction which references a location in memory, referred to as a memory reference instruction. Examples of memory reference instructions are a load (of data from a memory location to a register) and a store (of data from a register to a memory location). During compilation, such information is useful in determining whether it is possible to re-order certain operations for more efficient code execution.

However, a dynamic binary optimizer typically produces executable code from other executable code. Executable code may, for example, store a value in a first register at an address derived from the values in one or more other registers. It is difficult for the optimizer in these circumstance to know where the first register value is being stored or what the memory destination represents. The dynamic binary optimizer therefore must make conservative assumptions with respect to re-ordering of operations. As a result, it is often unable to re-order operations to increase code execution efficiency for lack of aliasing knowledge, when in fact it would have been safe to re-order the operations had the optimizer had greater knowledge.

A need exists, not necessarily recognized, for a better mechanism to support dynamic binary optimization, and particularly to support dynamic binary optimization by providing greater aliasing information.

SUMMARY

A compiler compiles code in a target program for later execution with a dynamic binary optimizer by associating aliasing information with the compiled code. When the program is subsequently executed with a dynamic binary optimizer, the dynamic binary optimizer accesses the aliasing information to determine whether certain optimizations can be safely performed.

In the preferred embodiment, the aliasing information includes a memory reference index and a may-alias bit matrix. The memory reference index assigns a respective index number to each memory reference instruction within the compiled code module. The may-alias bit matrix is a square bit matrix indicating, for each memory reference instruction, which other memory reference instructions might reference the same memory location. However, aliasing information might alternatively be expressed in other forms.

In the preferred embodiment, the target program is compiled with a static compiler which includes an option to include aliasing information in the compiled code module. If the option is selected, aliasing information which is normally generated during the compilation process from the source is embedded in the compiled code module, along with an indication to the dynamic binary optimizer that the compiled module has been so prepared. This statically compiled code is saved and can later be executed multiple times, each execution instance being optimized separately by the dynamic binary optimizer. During execution, the dynamic binary optimizer retrieves the aliasing information from the compiled code module, and uses it to identify memory reference instructions which may reference the same memory location, and therefore must occur in a pre-determined order. The dynamic binary optimizer may re-order the instructions to achieve greater execution efficiency subject to any pre-determined ordering constraints.

In one exemplary embodiment, a previously compiled legacy program includes both an executable code version containing processor-executable instructions and an intermediate level code version, although the source code is not necessarily available. The intermediate level code version contains aliasing information. The legacy program is re-compiled from the intermediate level code version to include aliasing information in the compiled code module, for later use in dynamic binary optimization.

In another exemplary embodiment, a program is compiled from its source code version, including aliasing information derived directly from the source code in the compiled code module, for later use in dynamic binary optimization.

The inclusion of aliasing information in the compiled code module for use in later dynamic binary optimization, in accordance with the preferred embodiment described herein, provides more complete and accurate information to the optimizer, enabling it to make more effective code optimizations during execution. Since this information is usually generated by the static compiler anyway (and then discarded), the saving of these data structures imposes very little overhead burden on a compilation process.

The details of the present invention, both as to its structure and operation, can best be understood in reference to the accompanying drawings, in which like reference numerals refer to like parts, and in which:

BRIEF DESCRIPTION OF THE SEVERAL VIEWS OF THE DRAWING

FIG. 4 is a conceptual illustration showing in greater detail the structure of a memory reference index embedded in a compiled code module, according to the preferred embodiment.

FIG. 5 is a conceptual illustration showing in greater detail the structure of a may-alias bit matrix embedded in a compiled code module, according to the preferred embodiment.

DETAILED DESCRIPTION

Figure 1:
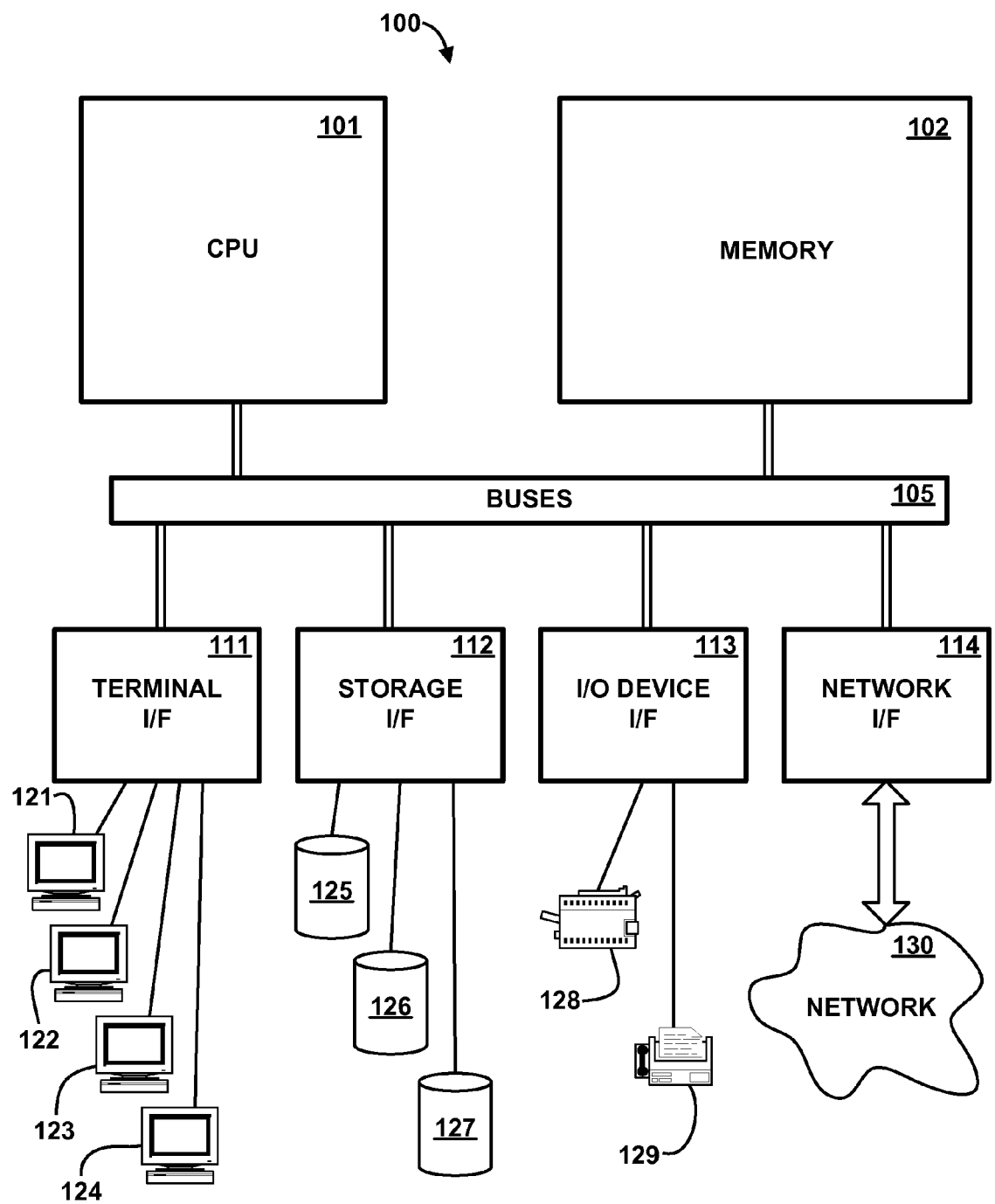
FIG. 1 is a high-level block diagram of the major hardware components of a computer system for use in dynamic binary optimization of computer program code, according to the preferred embodiment of the present invention.

Referring to the Drawing, wherein like numbers denote like parts throughout the several views, FIG. 1 is a high-level representation of the major hardware components of a computer system 100 for use in dynamic binary optimization of computer program code, according to the preferred embodiment of the present invention. Computer system 100 includes at least one general-purpose programmable processor (CPU) 101 which executes instructions of a pre-defined instruction set and processes data from main memory 102. Main memory 102 is preferably a random access memory using any of various memory technologies, in which data is loaded from storage or otherwise for processing by CPU 101.

One or more communications buses 105 provide a data communication path for transferring data among CPU 101, main memory 102 and various I/O interface units 111-114, which may also be known as I/O processors (IOPs) or I/O adapters (IOAs). The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to one or more external networks 130 (of which one is shown) for communication with one or more other digital devices. Network 130 may be any of various local or wide area networks as are known in the art. For example, network 130 may be an Ethernet local area network, or it may be the Internet.

It should be understood that FIG. 1 is intended to depict the representative major components of computer system 100 at a high level, that individual components may have greater complexity than represented in FIG. 1, that components other than or in addition to those shown in FIG. 1 may be present, that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 105 are shown in FIG. 1 as a single entity, in fact communication among various system components is typically accomplished through a complex hierarchy of buses, interfaces, and so forth, in which higher-speed paths are used for communications between CPU 101 and memory 102, and lower speed paths are used for communications with I/O interface units 111-114. Buses 105 may be arranged in any of various forms, such as point-to-point links in hierarchical, star or web configurations, multiple hierarchical buses, parallel and redundant paths, etc. For example, as is known in a NUMA architecture, communications paths may be arranged on a nodal basis. Buses may use, e.g., an industry standard PCI bus, or any other appropriate bus technology. While multiple I/O interface units are shown that separate buses 105 from various communications paths running to the various I/O devices, it would alternatively be possible to connect some or all of the I/O devices directly to one or more system buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might be used to provide a user interface to users executing applications which access a database (similar to client applications which invoke a server to access a database over a network), but which execute directly on computer system 100, without the need to communicate through a network. System 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems. In particular, static code compilation of a target program could be performed on a first computer system, while execution of the same target program and dynamic binary optimization during execution could be performed on a second computer system.

While various system components have been described and shown at a high level, it should be understood that a typical computer system contains many other components not shown, which are not essential to an understanding of the present invention. In the preferred embodiment, computer system 100 is a multi-user computer system, such as a computer system based on the IBM i™ architecture, it being understood that the present invention could be implemented on other computer systems.

Figure 2:
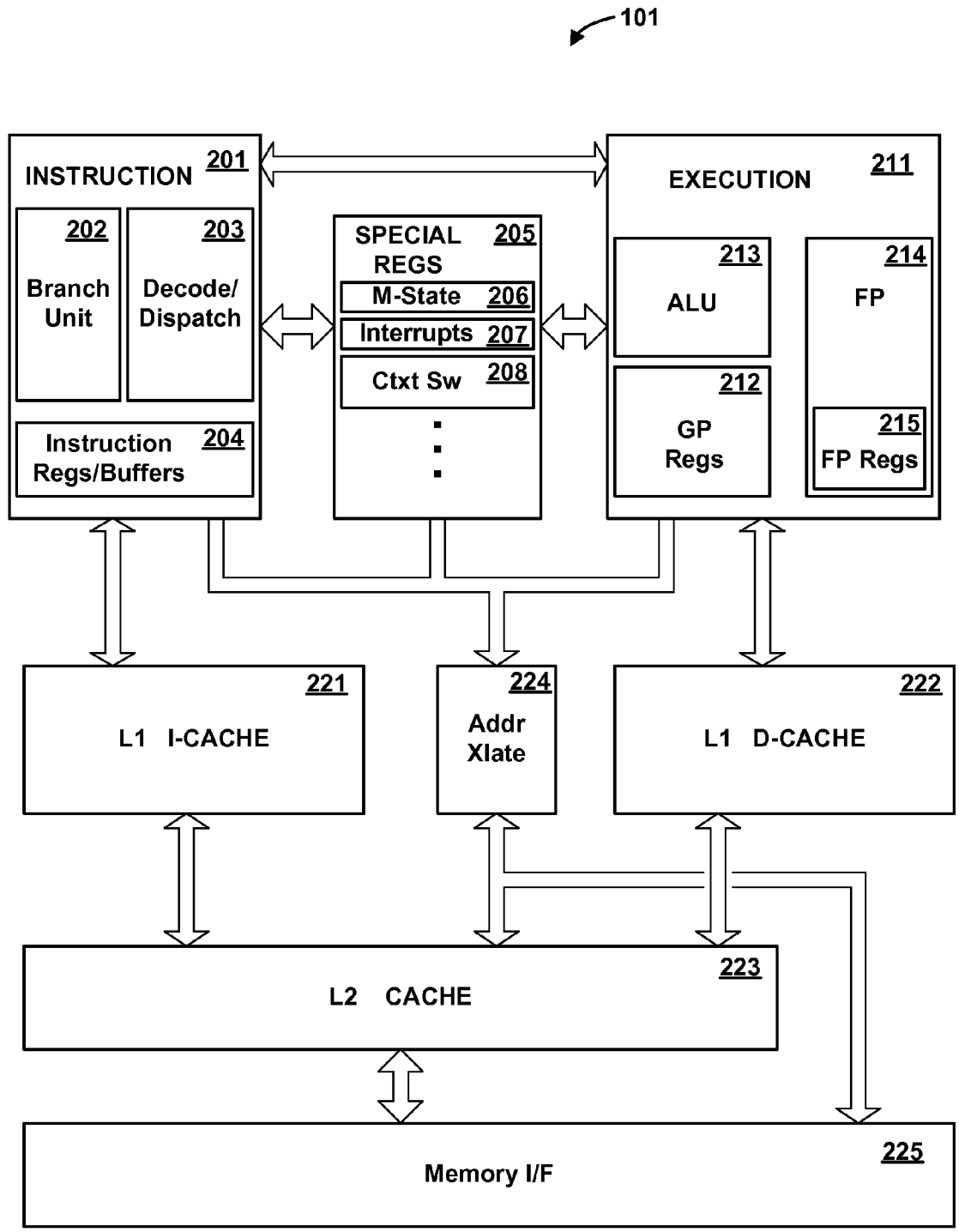
FIG. 2 is a high-level block diagram showing the major hardware components of a processor within the computer system of the preferred embodiment.

FIG. 2 is a high-level diagram of the major components of a central processor unit (CPU) 101, also sometimes called a processor or processor core, including certain associated cache structures, according to the preferred embodiment, showing CPU 101 in greater detail than is depicted in FIG. 1. As explained previously, system 100 may contain multiple CPUs, although only a single one is shown in FIG. 2. CPU 101 includes instruction unit portion 201, special register portion 205, and execution unit portion 211. Also shown in FIG. 2 are Level 1 Instruction Cache (L1 I-Cache) 221, Level 1 Data Cache (L1 D-Cache) 222, Level 2 Cache (L2 Cache) 223, Address Translation unit 224, and Memory Interface 225. In general, instruction unit 201 obtains instructions from L1 I-cache 221, decodes instructions of the CPU's pre-defined instruction set to determine operations to perform, and resolves branch conditions to control program flow. Execution unit 211 performs arithmetic and logical operations on data in registers, and loads or stores data from L1 D-Cache 222. Special registers 205 contain various state data for controlling instruction flow and proper operation of the CPU not included in instruction unit 201 or execution unit 211. L2 Cache 223 is a level 2 cache, generally larger than L1 I-Cache 221 or L1 D-Cache 222, providing data to L1 I-Cache 221 and L1 D-Cache 222. L2 Cache 223 obtains data from a lower level cache (not shown) or from main memory through memory interface 225.

Caches at any level are logically extensions of main memory. In the exemplary embodiment, L1 and L2 caches 221-223 are physically packaged with the CPU, e.g., are implemented on the same integrated circuit chip as the CPU. For this reason, these caches are sometimes considered a part of the CPU. In this embodiment, each CPU has its own respective L1 and L2 caches, which are not shared with other CPUs, although it is alternatively possible that some or all caches be shared. The representation of FIG. 2 is intended to be typical, and is not intended to limit the present invention to any particular physical or logical cache implementation. It will be recognized that processors and caches could be designed according to different arrangements, and the processor chip or chips may include more caches or fewer caches than represented in FIG. 2, or no caches at all.

Instruction unit 201 comprises branch unit 202, instruction decode/dispatch unit 203, and instruction registers and buffers 204. Instructions from L1 I-cache 221 are loaded into buffers 204 prior to execution. Depending on the CPU design, there may be multiple buffers (e.g., buffers for different threads, or within a thread, one for a sequential series of instructions, and others for branch-to locations), each of which may contain multiple instructions. Decode/dispatch unit 203 selects one or more instructions to be dispatched for execution from one or more of buffers 204 in a current machine cycle, and decodes the instruction(s) according to the semantics of the processor's pre-defined instruction set to determine the operation(s) to be performed or branch conditions. Branch unit 202 controls the program flow by evaluating branch conditions, and refills buffers 204 from L1 I-cache 221.

At least some of the instructions encountered and decoded by the instruction unit are memory reference instructions, which reference locations in memory. Examples of memory reference instructions are a load instruction to load data from a designated memory location to a designated register or registers 212 or 215, and a store instruction to store data from a designated register to a memory location. Depending on the processor architecture, there may be additional memory reference instructions.

Execution unit 211 comprises a set of general purpose registers 212 for storing data and a scalar arithmetic logic unit (ALU) 213 for performing arithmetic and logical operations on data in general purpose (GP) registers 212 responsive to instructions decoded by instruction unit 201. Execution unit 211 may further include any of various special-purpose computational subunits. For example, depicted in FIG. 2 is a floating point operations subunit 214, which is preferably a special floating point hardware pipeline for performing floating point operations using larger operands (e.g. double-precision 64-bit operands). Other special purpose units (not shown) could optionally be included, such as a vector operation subunit for performing common operations on multiple operands in parallel. Floating point subunit 214 (and optionally, other special purpose units) each includes its own respective set of registers 215. Both general-purpose registers 212 and floating pont registers 215 are generally available for use by compiled programs executing on processor 101. In particular, a compiler compiling programs for execution on processor 101 can use any or all of these registers for holding arbitrary program state data as the compiler determines will result in most efficient execution of the program. In addition to components shown in FIG. 2, execution unit 211 may include additional logic, counters, control hardware, and so forth, and could include multiple copies of some units, such as multiple ALUs 213. It will be understood that the execution unit 211 represented in FIG. 2 is intended to be representative, and that an execution unit may have additional subunits and components (including additional pipelines and registers) or may have fewer than all of the components shown in FIG. 2.

Special registers 205 contain certain state data other than instructions (contained in instruction registers 204) and general purpose data upon which instructions operate (contained in registers 212, 215). For example, special registers 205 may include machine state register 206 which may contain, among other things, data indicating a privilege level of a currently executing thread or threads (if the CPU supports multiple concurrent thread execution); interrupt vectors 207; error indications; and other special registers.

Special registers 205 may further include one or more context switch registers 208, which are reserved for use by a specially privileged process, such as an operating system kernel, for holding certain state information used in switching execution contexts, such as .address data identifying the location of a context save area in memory.

L1 I-cache 221 and L1 D-cache 222 are separate instruction and data caches providing data to instruction and execution units, although they may alternatively be a single combined cache. L2 cache 223 is a non-discriminated cache containing both instructions and non-instruction data. Typically, data is taken from or stored to an L1 cache by the instruction or execution unit, and if the data is unavailable in an L1 cache, it is loaded into the L1 cache from L2 cache 223, which in turn obtains it from a lower level cache or main memory through memory interface 225. Depending on the processor design, it may be possible to by-pass a cache at one level and load data from a lower level cache or memory.

Address translation unit 224 translates effective addresses (in some architectures, called "virtual addresses" or some other name) generated by the processor to corresponding real addresses in memory. As is known in the art, a fundamental difference exists between effective addresses on the one hand, and real addresses on the other. An effective address has no fixed correspondence to a physical memory location; this correspondence changes as new pages are loaded into main memory from storage, as processes change, and so forth. A real address corresponds to a fixed physical memory location, although it does not necessarily translate directly to the location. When the processor executes a memory reference instruction, it generates an effective address (which may be called "virtual" or some other term) in an effective address space corresponding to each respective executing process. In some computer architectures, there are multiple levels of effective or virtual address, which may require further translation. A processor-generated effective address could, in some architectures, simply be an address contained in the instruction itself. However, in most modern systems, the effective address space is so large relative to the size of the instruction that instructions do not contain full addresses. Therefore, an address is contained in a register which is referenced by the instruction, or obtained as a sum of multiple values, such of an offset value contained in the instruction and one or more values each contained in a respective register. The effective addresses are further translated to "real addresses", corresponding to the actual memory locations at which the data is located by address translation unit 224. It will be understood that various computer architectures employ different addressing constructs, and the present invention is not limited to any particular form of addressing.

L1 I-Cache 221 and L1 D-Cache 222 are preferably addressed using effective addresses, and therefore no address translation is required for accessing the level 1 caches. However, the L2 Cache 223 and all memory below it are addressed using real addresses. Therefore, if it is necessary to access a lower level cache or main memory, an effective address generated by the processor is first translated to a real address. It will be understood that the L1 caches could alternatively be addressed with real addresses, or any of the lower level caches could alternatively be addressed with effective addresses.

Address translation unit 224 is represented as a single logical entity, but typically includes multiple tables and logic circuitry, which may be distributed in various chip locations. For example, an address translation mechanism may include a translation look-aside buffer, an effective-to-real address translation table, a segment table, and additional structures. Additionally, separate structures could be used for translation of instructions and for non-instruction data.

CPU 101 may be a multithreaded processor supporting the concurrent execution of multiple threads and simultaneous dispatching of instructions from different threads in the same machine cycle, or it may be a single threaded processor. Where multi-threading is supported, a separate set of most registers typically exists for each thread. I.e., a separate set of general purpose registers 212 and floating point registers 215 exists for each thread. Additionally, certain other state or special purpose registers may be duplicated to support multiple active threads. The execution unit pipeline hardware, the instruction unit, and the caches are typically shared by all threads.

While various CPU components have been described and shown at a high level, it should be understood that the CPU of the preferred embodiment contains many other components not shown, which are not essential to an understanding of the present invention. For example, various additional special purpose registers will be required in a typical design. Furthermore, it will be understood that the CPU of FIG. 2 is simply one example of a CPU architecture, and that many variations could exist in the number, type and arrangement of components within CPU 101, that components not shown may exist in addition to those depicted, and that not all components depicted might be present in a CPU design. For example, the number and configuration of buffers and caches may vary; the number and function of execution unit pipelines may vary; registers may be configured in different arrays and sets; dedicated floating point hardware may or may not be present; etc. Furthermore, CPU 101 may utilize a simple or complex instruction set.

Figure 3:
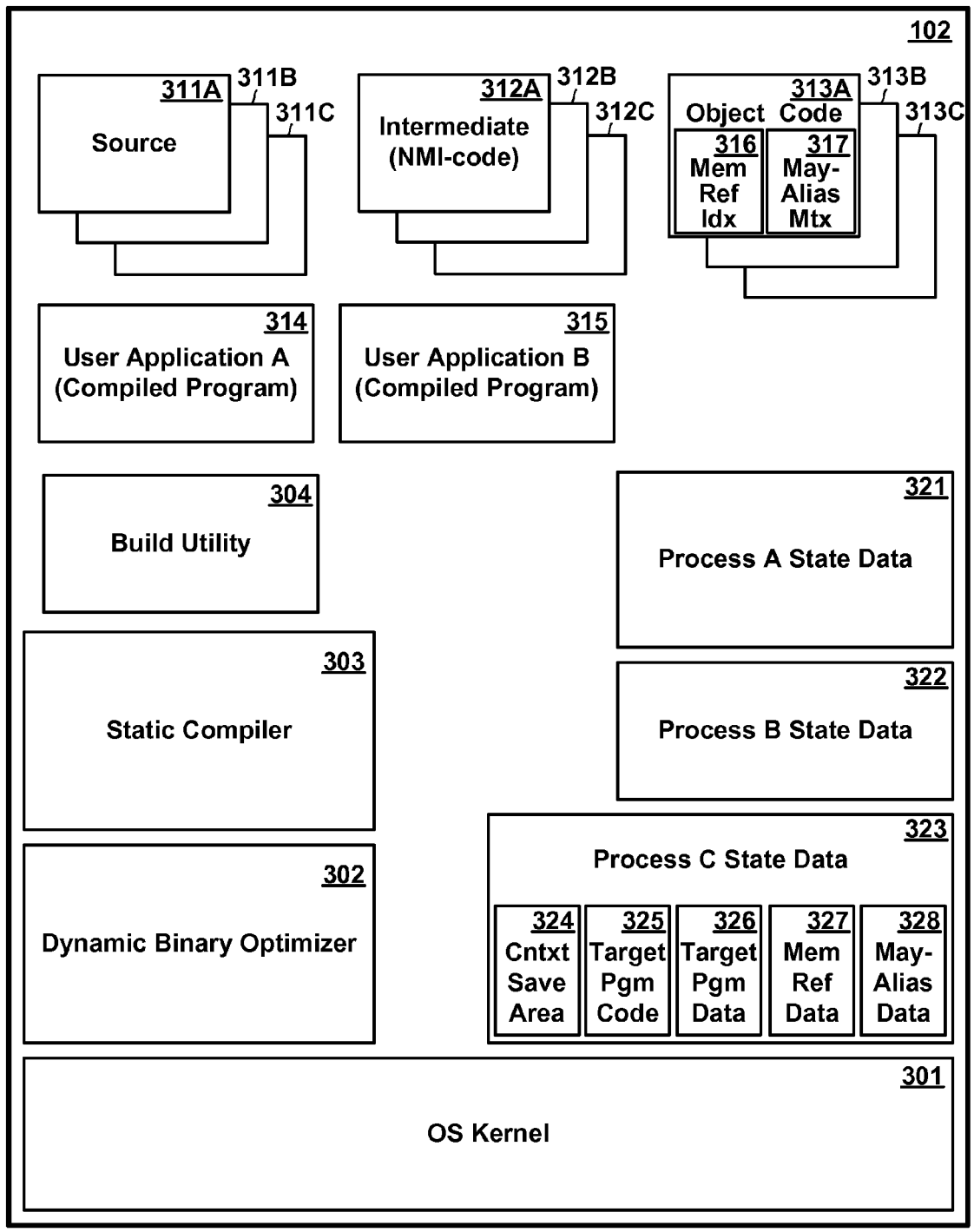
FIG. 3 is a conceptual illustration of the major software components in memory of the computer system of the preferred embodiment.

FIG. 3 is a conceptual illustration of the major software components of system 100 in memory 102. Operating system kernel 301 is executable code and state data providing various low-level software functions, such as device interfaces, management of memory pages, management and dispatching of multiple tasks, etc. as is well-known in the art. Dynamic Binary Optimizer 302, sometimes also called a virtual machine, is an executable program for supporting execution and dynamic optimization of a compiled executable target program, as explained in greater detail herein. Static compiler 303 is an executable computer program which compiles source code modules in a high-level language (or, alternatively, code modules in an intermediate, previously parsed symbolic form) into object code modules of processor-executable instructions. Build utility 304 is an executable computer program which builds application programs by incorporating or linking (also known as binding) multiple previously compiled object code modules and programs.

Also shown in FIG. 3 are multiple source code modules 311A-C (herein generically referred to as feature 311, multiple intermediate code modules 312A-C (herein generically referred to as feature 312), and multiple object code modules 313A-C (herein generically referred to as feature 313). Source code modules 311 are code modules in a high level language created using a source editor (not shown) or general-purpose editor (not shown). Such modules could be created on another computer system. Intermediate code modules are code modules in an intermediate symbolic language, which is neither a high-level language intended for human representation, nor directly executable code. Examples of intermediate code representations are Stanford p-code, IBM™ w-code, IBM™ New Machine Interface (NMI) code, and JAVA™ bytecodes. Intermediate code is produced from the source by a special purpose parser or "front-end compiler" (not shown), or alternatively as a by-product of compilation by static compiler 303. Object code modules 313 are modules containing processor-executable instructions which are directly executable on processor 101, and are produced by static compiler 303. Each object code module is produced either directly from a corresponding source module 311, or by pre-compiling a source module to an intermediate code module 312, and then compiling the intermediate code module to a corresponding object code module.

User application programs 314, 315 are executable programs which are built by build utility 304 from multiple object code modules 313. The build utility may further incorporate compiled procedures from various program libraries (not shown) when building an application program.

In the preferred embodiment, each of at least some object code modules 313 are compiled to include aliasing information in the form of a memory reference index 316 and a may-alias bit matrix 317. Preferably, memory reference index 316 and may-alias bit matrix 317 are included in the compiled object code module responsive to an optional directive to static compiler 303, so that not necessarily all object code modules will contain these data structures. Aliasing information is used by dynamic binary optimizer 302 during execution to support certain optimizations, as explained in greater detail herein.

OS Kernel 301 supports concurrent execution of multiple processes, as is well known in the art. For each concurrently executing process, a respective process state data area 321-323 is maintained, each process state data area containing state data particular to the executing process. FIG. 3 depicts three process state data areas 321-323, it being understood that this number may vary, and is typically much larger. Each process state data may include, e.g., a process stack, a process heap, and/or other data structures.

In particular, a process executing a target user application program through an instance of dynamic binary optimizer 302 is represented as process state data area 323. In addition to any of the various data structures which may be present in any process state data area, process state data area 323 includes a target program context save area 324, a target program optimized code cache 325, a target program data area 326, a target program memory reference index area 327 containing at least memory reference index 316, and a target program may-alias data area 328 containing at least one may-alias bit matrix 317. Target program context save area 324 is used to temporarily store the processor state when the target program is interrupted by the optimizer so that the optimizer can perform various optimization functions. Target program optimized code cache 325 stores target program code as altered by the optimizer during dynamic optimization; this optimized code is not necessarily saved, and the original target program executable code remains unchanged as a result of executing the target program with the dynamic binary optimizer. Target program data area 326 holds data referenced by the target program during execution. Target program memory reference index area 327 and target program may-alias data area 328 hold information similar to index 316 and matrix 317 embedded in the object code module for the target program. Where the target program contains multiple object code modules, index 327 may contain multiple separate indexes, one for each object code module. Similarly, may alias data 328 may contain multiple separate may-alias bit matrices 317, one for each object code module of the program. In the preferred embodiment, the memory reference indexes and may-alias bit matrices from different modules are not combined in respective common data structures, although it would alternatively be possible to do so.

Various software entities are represented in FIG. 3 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 3, it will be understood that the actual number of such entities may vary, and in particular, that in a complex computer system environment, the number and complexity of such entities is typically much larger, and that other entities (not shown) may be present. Additionally, although software components 301-304, 311-317, and 321-328 are depicted in FIG. 3 on a single computer system 100 for completeness of the representation, it is not necessarily true that all programs, functions and data will be present on a single computer system or will be performed on a single computer system. In particular, static compiler 303 and/or build utility 304 may be located on a different system than dynamic binary optimizer 302, and any of source code 311, intermediate code 312, or object code modules 313 may or may not be present in the same system as the dynamic binary optimizer. In fact, although source modules are illustrated in FIG. 3 for completeness, in many cases source modules may no longer exist or, if they exist, may be unavailable or in an unknown location.

While the software components of FIG. 3 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 3 is not meant to imply any particular memory organizational model, and that system 100 might employ a single address space virtual memory, or might employ multiple virtual address spaces that overlap.

Figures 4, 5:
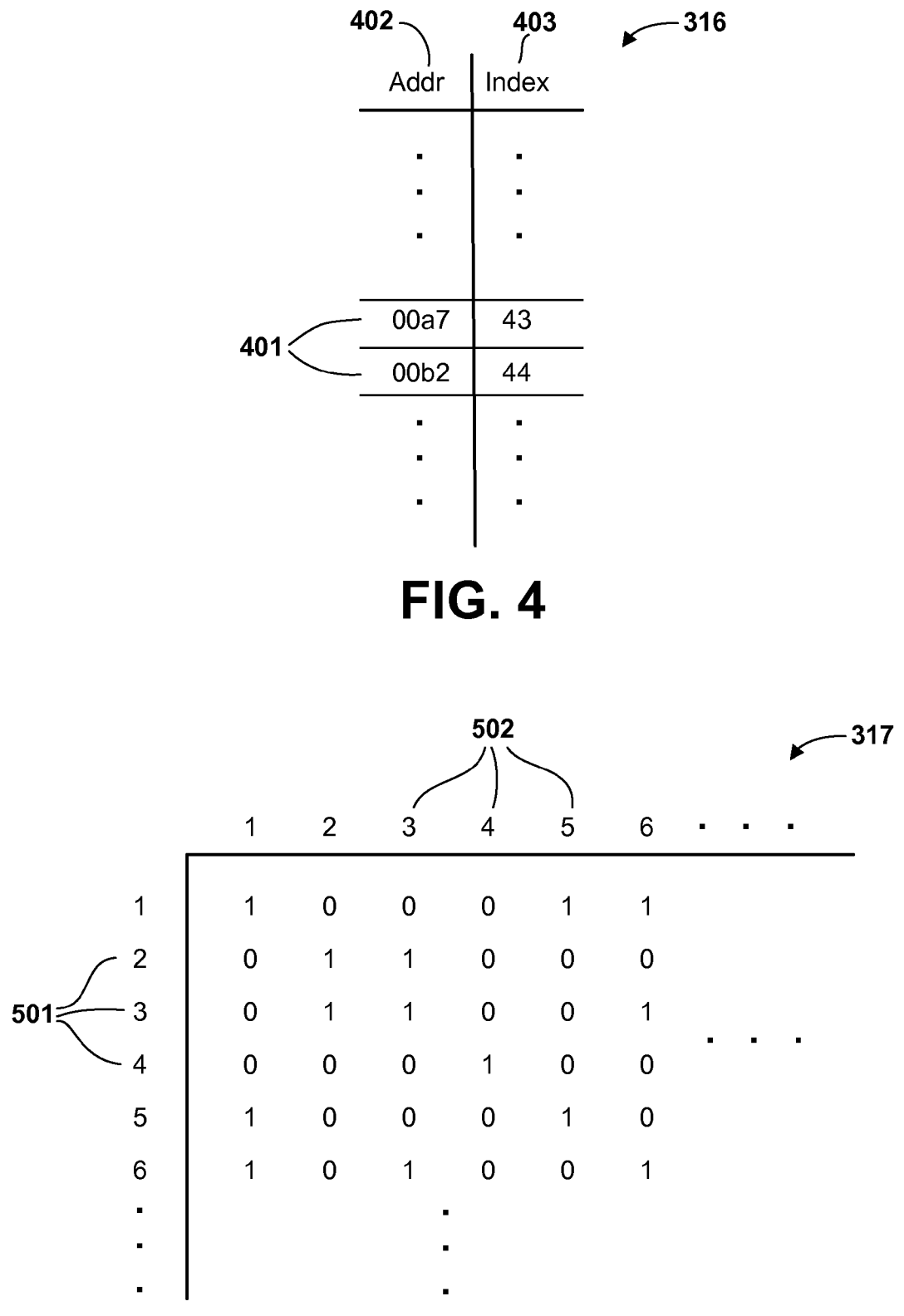

FIG. 4 is a conceptual illustration showing in greater detail the structure of a memory reference index 316 embedded in a compiled code module 313, according to the preferred embodiment. Referring to FIG. 4, memory reference index 316 is conceptually a table containing multiple entries 401, each entry corresponding to a respective memory reference instruction within the compiled object code module in which it is embedded. Each entry 401 contains two fields. A relative address field 402 contains an offset, or module-relative, address of the corresponding memory reference instruction. As is known in the art, object code modules are typically relocatable within the address space of an executing process. The module-relative address is an address of the corresponding instruction, relative to some base address to which the object code module is relocated, the base address normally being determined at run-time. The effective address of the corresponding instruction during execution can be obtained as the sum of the base address within the effective address space of the executing process and the module-relative (offset) address. An index field 403 contains an index number of the corresponding memory reference instruction. The index numbers are unique and are from a consecutive sequence of N integers, where N is the total number of entries in memory reference index 316. E.g., the index numbers might range from 0 to N−1, or from 1 to N, although not necessarily in sequential order. Memory reference index 316 thus enables a determination of the index number corresponding to a module relative address of any instruction, or vice versa.

FIG. 5 is a conceptual illustration showing in greater detail the structure of a may-alias bit matrix 317 embedded in a compiled object code module 313, according to the preferred embodiment. May-alias bit matrix 317 is a bit matrix containing N rows and N columns, where N is the total number of memory reference instruction entries in index 316, i.e. the total number of memory reference instructions in the compiled object code module in which it is contained. Each row 501 corresponds to a single memory reference instruction having an index number corresponding to the ordinality of the row. Each column 502 similarly corresponds to a single memory reference instruction having an index number corresponding to the ordinality of the column. A cell of the matrix at row i and column j is a single bit indicating whether memory reference instruction having index i might access the same memory location as memory reference instruction having index j. It will be observed that the cells on the diagonal of the matrix are necessarily all ones, and that the matrix is symmetric across the diagonal. May-alias bit matrix 317 thus enables an optimizer to determine, for a given memory reference instruction, all other instructions within the same object code module which may access the same memory location.

It will be understood that memory reference index 316 and may-alias bit matrix 317 are illustrated conceptually in FIGS. 4 and 5, and that the actual structure of the data may vary. For example, an index number 403 might be implied by the position of the entry if the index numbers are sequential. Any of various known techniques for organizing, representing and/or compressing data might be used. Furthermore, alternative and/or additional data structures may be used to store aliasing information within the object code module 313 for later use by a dynamic binary optimizer. Finally, although memory reference index 316 and may-alias index 317 are preferably embedded within the object code module, they could be separate files or objects which are referenced by the object code module to which they pertain.

Figure 6:
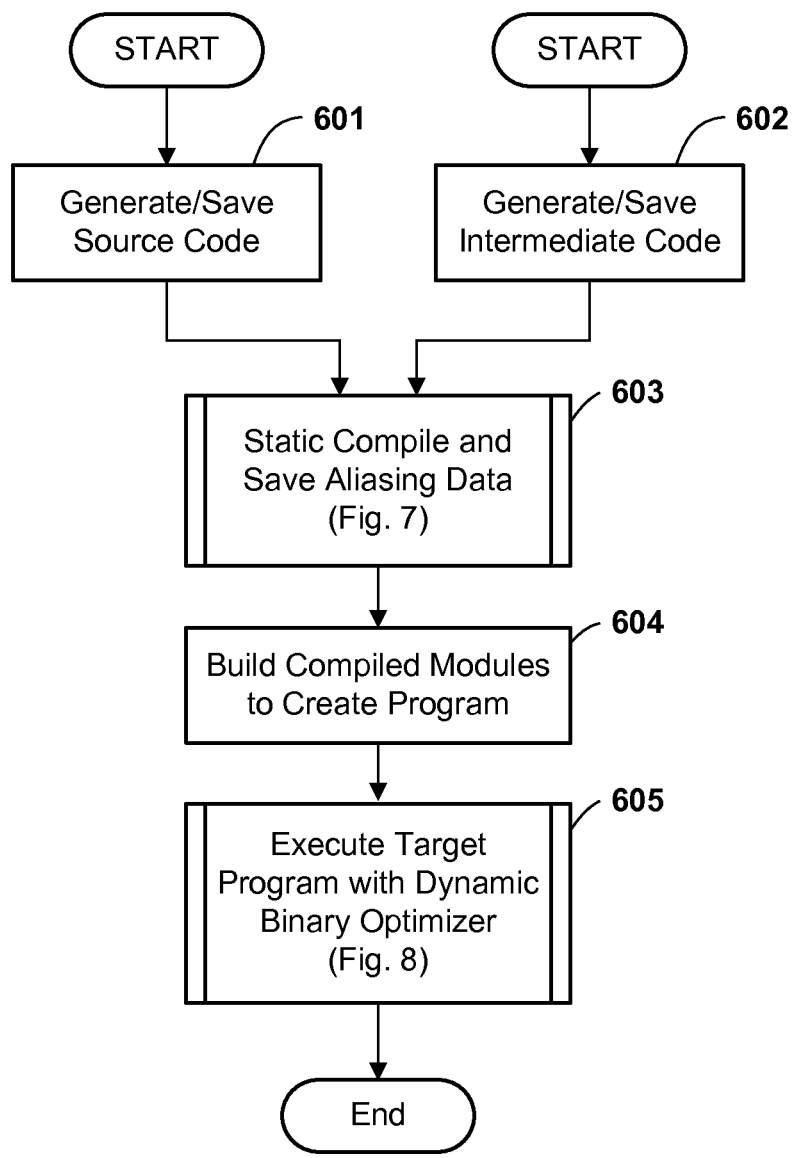
FIG. 6 is a high-level flow diagram showing a general process of creating an executable target program and executing the target program using a dynamic binary optimizer, in accordance with the preferred embodiment.

FIG. 6. is a high-level flow diagram showing a general process of creating an executable target program and executing the target program using a dynamically binary optimizer, in accordance with the preferred embodiment. Referring to FIG. 6, a program can either be compiled directly from the source code, as indicated by the flow starting from block 601, or may be compiled from some intermediate form of code, as indicated by the flow starting from block 602. Source code as indicated by block 601 may be generated in any conventional manner by the programmer, such as with a source editor. In accordance with the preferred embodiment, no special statements or structure is required of the source code, and in general any conventional source code in a high-level language can be dynamically optimized, although not all code will optimize with the same efficiency. An intermediate form of code may be generated by a special intermediate code generator for that purpose, or may be a by-product of previous compilation. For example, in the case of the IBM i platform, the compiler automatically generates an intermediate representation known as "NMI code" and includes it in the compiled program object along with the processor-executable instructions. Often, in the case of legacy programs, the original source code may no longer be available. However, if the original source was compiled on a platform or using a compiler which generates an intermediate representation, such as "NMI code", then the program can be recompiled from the intermediate representation for use in accordance with the preferred embodiment of the present invention, provided that sufficient aliasing information exists in the intermediate code representation, notwithstanding that the original source is not available. The source or the intermediate code representation could have been generated many years before compilation and execution as described in blocks 603-605, and could have been generated on a different system using a different processor and/or operating system architecture.

Whether using source code or an intermediate representation, a compiler compiles one or more program modules to produce modules of processor-executable instructions (also known as object code modules). During compilation, the compiler generates a memory reference index 316 and may-alias bit matrix 317 for each object code module 313, and saves these within the object code module. This compilation process is represented at a high level as block 603 in FIG. 6, and is shown in greater detail in FIG. 7.

Figure 7:
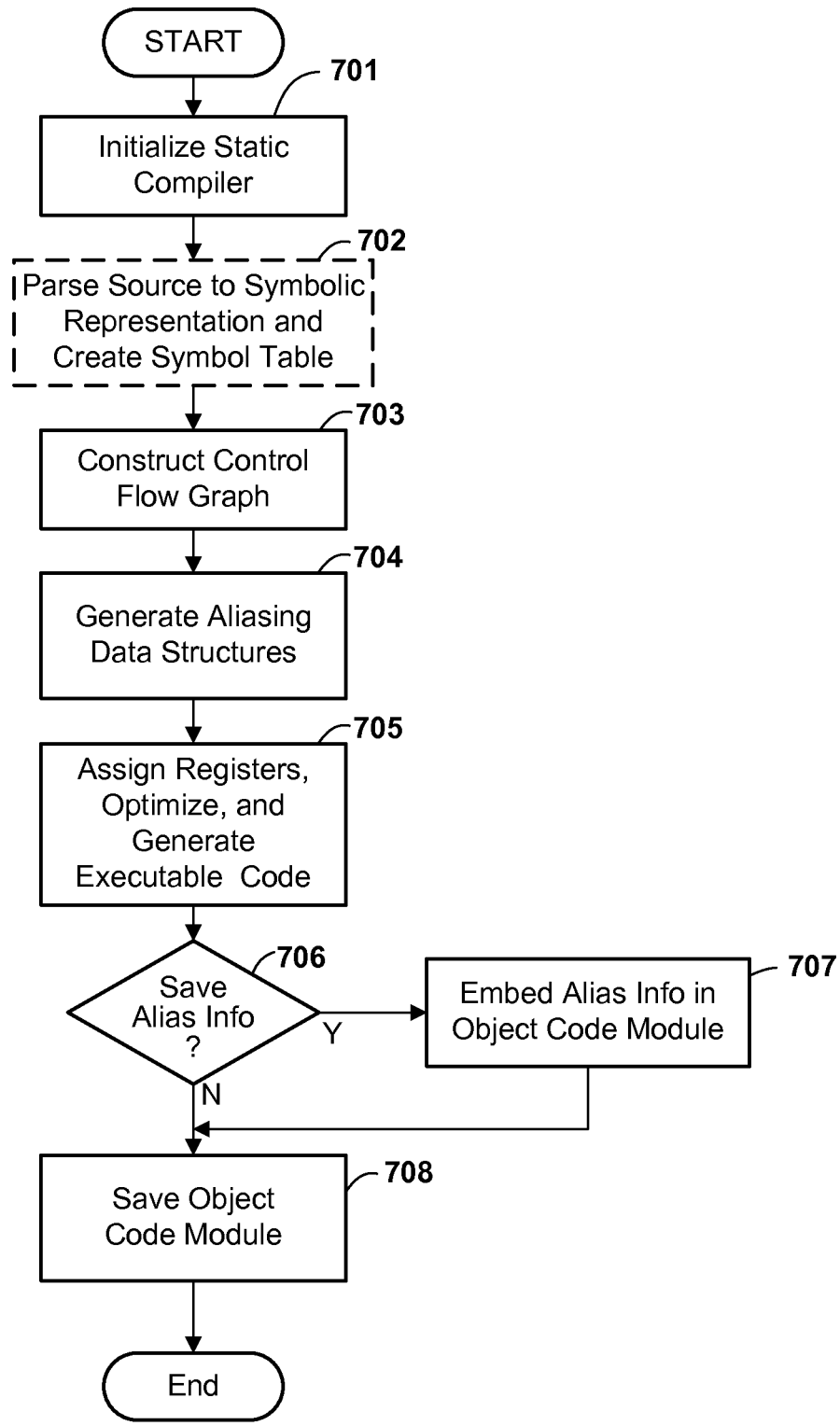
FIG. 7 is a high-level flow diagram showing a process of statically compiling one or more modules of a target program for execution using a dynamic binary optimizer, in accordance with the preferred embodiment.

FIG. 7 is a high-level flow diagram showing a process of statically compiling one or more modules of the target program for execution using a dynamic binary optimizer, in accordance with the preferred embodiment.

Referring to FIG. 7, static compiler 303 is invoked and initialized (block 701). A source code file 311 or intermediate code file 312 to be compiled is specified when the compiler is invoked.

The compiler optionally parses source file 311 to generate an intermediate symbolic code representation and a mapping of variables, procedure names, and so forth used in the source (block 702). This process is sometimes referred to as "front-end compilation". Generally, this is only necessary if compiling directly from source code. If the compiler is compiling from an intermediate code version, the intermediate code will typically contain the necessary information.

The compiler constructs a control flow graph (block 703). As is known in the compiler art, a control flow graph is a representation of flow of control in the code module being compiled, containing multiple nodes and directed arcs connecting the nodes, where each node represents a sequence of code instructions having only a single straight path of execution, and each arc represents a possible path (such as a branch) from one node to another.

The compiler generates data structures for holding aliasing information (block 704). In order to perform certain optimizations during static compilation, particularly the re-ordering of certain operations, the compiler should have aliasing information available to it. Preferably, these data structures are similar to memory reference index 316 and may-alias bit matrix 317 explained above. It will be understood that all of the information represented in FIGS. 4 and 5 may not be available at once, and that aliasing information may be generated in stages and provided in appropriate data structures as it becomes available. The generation of such aliasing information is known in the compiler art.

Using the control flow graph, the aliasing information, and any other necessary information, the compiler chooses an assignment of program variables to available registers and performs any supported code optimizations to generate optimized executable (object) code (block 705). Any of various register assignment techniques, now known or hereafter developed in the compiler art, may be employed. The optimizations performed will depend on the compiler and could, include, for example, removal of unnecessary code statements, re-ordering of operations, refinement of aliases, and so forth, as is known in the art. Optimizations may be performed before register assignment or after, and some may be performed before while others are performed later. Optimizations may include any optimization technique now known or hereafter developed. It is not essential that the compiler perform any particular optimization, or that the compiler be an optimizing compiler.

In the preferred embodiment, the user specifies whether aliasing information is to be preserved in the compiled object code module as a compiler option when the compiler is invoked. Such an option may be a default selection, or may be explicitly specified. If the preservation of aliasing information is specified, the 'Y' branch is taken from block 706, and aliasing information from the previously generated aliasing data structures is embedded in the object code module in an appropriate format as explained earlier (block 707). At this point, the compiler has available to it the offsets of each generated memory reference instruction to be placed in field 402 of memory reference index 316; this information was not available when internal data structures for holding aliasing information were generated at block 704. If the user does not explicitly or implicitly specify saving aliasing information, the 'N' branch is taken from block 706, and step 707 is by-passed. It will be understood that compiler 303 might alternatively automatically embed such aliasing information in all compiled modules, without giving the user the option to so specify. In any case, the compiled object code module is then saved as one or more files in an appropriate persistent form on a storage device, such as any of devices 125-127 (block 708). Furthermore, while the aliasing data structures are preferably embedded within the object code module itself, it would alternatively be possible to store them in a separate file or module which is referenced by the compiled code.

The compiler typically is invoked separately for each code module to be compiled. Different code modules may be compiled at approximately the same time, or may be compiled at different times, and may be compiled on different machines, or on a single machine different from that on which they are to be executed.

Referring again to FIG. 6, after compilation, a program is built from one or more compiled object code modules (block 604) using build utility 304. Build is a process of linking multiple compiled object code modules into a single executable program. The resultant executable program may, e.g., be a single file which contains a header and embeds code from one or more compiled object code modules, and may contain references to external object code modules. Depending on the architecture and/or the size of the program, a build may be unnecessary and it is possible that compilation alone produces a program in executable form.

The executable program is generally a file (or multiple files). As a program file, it may be stored on the system indefinitely and/or loaded to another computer system. In some architectures, build is generally performed immediately prior to execution.

The program is then executed using the dynamic binary optimizer. Program execution is represented at a high level as block 605 in FIG. 6, and is shown in greater detail in FIG. 8.

Figure 8:
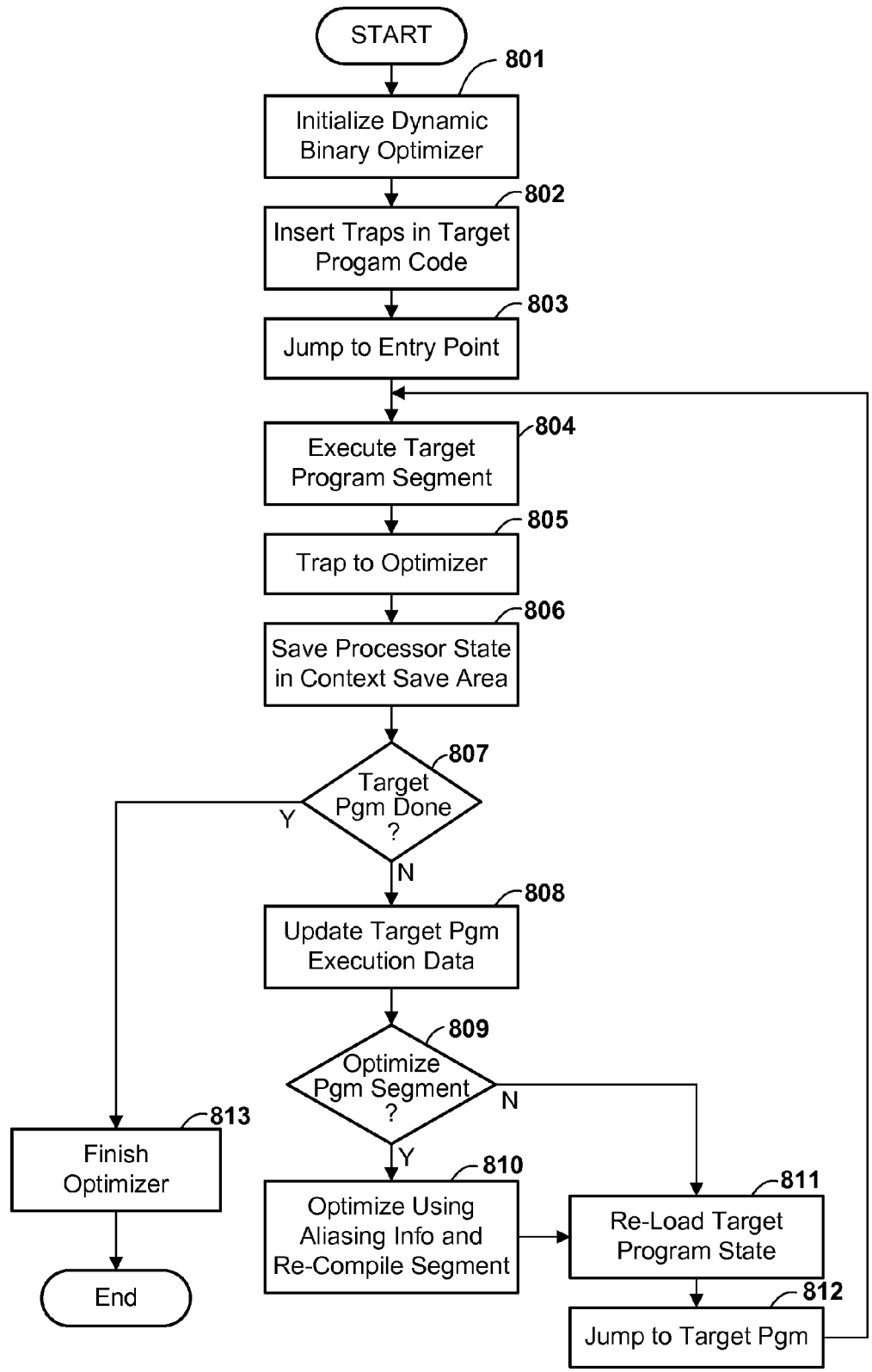
FIG. 8 is a high-level flow diagram showing a process executing a target program using a dynamic binary optimizer, in accordance with the preferred embodiment.

FIG. 8 is a high-level flow diagram showing a process of executing a target program using dynamic binary optimizer 302, in accordance with the preferred embodiment. Referring to FIG. 8, the dynamic binary optimizer is invoked for execution of the target program and allocates state data structures in the applicable process data area (block 801).

The dynamic binary optimizer is itself an executable program. When executed, it emulates a virtual machine which executes other executable programs, in this case the target program, and thus the target program is a program within a program Like any executable program, the dynamic binary optimizer is invoked on behalf of a user process, the user process having a process data area. A process data area for the process executing the dynamic binary optimizer is shown in FIG. 2 as feature 323. Among the state data which the dynamic binary optimizer maintains is target program optimized code 325, target program data 326, target program context save area 324, memory reference index area 327, and may-alias data area 328. Data within memory reference index area 327 and may-alias data area 328 is obtained from the memory reference index 316 and may-alias bit matrix 317 of each object code module of the target program. It is possible that only some modules will have this information, in which case the information for only the corresponding modules is loaded into data areas 327 and 328, and the relevant optimizations are only performed for those modules.

Dynamic binary optimizer 302 inserts traps into various compiled target program modules (block 802). Each trap causes execution of the target program's code sequence to halt and returns control to the dynamic binary optimizer. A trap might be nothing more than a single processor-executable instruction branching to a pre-determined code sequence of the optimizer itself. Traps are inserted at convenient locations for tracking target program execution flow and determining whether to optimize selective code portions. For example, a trap might be inserted every time there is a call to or return from a procedure.

After initializing and inserting any necessary traps, the dynamic binary optimizer jumps to an entry point in the compiled target program (block 803), causing a segment of the processor-executable instructions of the target program to execute directly on the processor 101 (block 804). Although the word "segment" is used, the instructions which are executed are not necessarily contiguous in addressable memory, nor is the segment necessarily of any pre-determined size. It is simply a portion of the program having one or more exit points and corresponding traps inserted at each exit point. During execution of the segment, the segment's processor-executable instructions may reference data in the target program data area 326, loading and storing data from this area of memory in the same manner as if it were executing directly, without any intervention of the dynamic binary optimizer. The program segment continues to execute until a trap is encountered (block 805).

Preferably, the trap causes a jump to a pre-determined code segment within the dynamic binary optimizer itself. The first order of business upon trapping is to save the state of the processor (block 806). In the preferred embodiment, processor state is saved by using a reserved general purpose register to hold address information for context save area 324 during target program execution at block 804, and saving register state to the location identified by the contents of the reserved register. In order to assure that a general purpose register will be available for this purpose, at least one general purpose register is reserved at compilation. This technique is described in greater detail in commonly owned U.S. patent application Ser. No. 13/016,003, filed on the same date as the present application, entitled "Ensuring Register Availability for Dynamic Binary Optimization", which is herein incorporated by reference. However, processor state could alternatively be saved using other techniques, now known or hereafter developed.

Once the target program's processor state has been saved, the dynamic binary optimizer can perform any desired optimization functions. The optimizer determines whether execution of the target program has completed (block 807). If not (the 'N' branch from block 807), the optimizer updates any execution data used for performing optimizations (block 808). For example, an optimizer will typically track the frequency of execution of selective code segments, and re-optimize and re-compile code if the segment is frequently executed. The optimizer may also choose to re-compile code deemed particularly inefficient. The optimizer therefore uses this execution data to determine whether a code segment (such as a procedure) should be re-optimized (block 809). If the decision is made to re-optimize a code segment, the corresponding code segment is re-optimized and re-compiled (block 810), and stored in target program optimized code area 325. Often, a segment to be re-optimized is one which would otherwise be executed next.

When performing optimizations at block 810, the optimizer may perform any optimization of code now known or hereafter developed. But in particular, at least one of the optimizations performable by the optimizer utilizes aliasing information contained in memory reference index area 327 and/or may-alias data area 328. Preferably, the optimizations include the re-ordering of operations performed by the processor where the aliasing information indicates that it is safe to do so. While such re-ordering of operations is known in the art of static compilers, it is not generally performed, or performed to a very limited extent, by dynamic optimizers, because they lack aliasing information. Since, in accordance with the preferred embodiment, useful aliasing information is available to the dynamic optimizer, the dynamic optimizer is able to re-order operations to the same or similar extent as static compilers. The aliasing information could be used to perform any other optimization or operation known or hereafter developed for use in static or dynamic compilers.

When the optimizer has completed updating its data and performed any desired optimizations, it reloads the processor state from the target program context save area (block 811). It then jumps to the code location at which target program execution was suspended (block 812), and the next target program segment executes (block 804).

When the target program has finished execution (i.e, it encounters a trap at an exit point in the program), the 'Y' branch is taken from block 807. The optimizer then performs any required final clean-up of data structures, output of data, etc., and ends execution (block 813).

As described above, multiple traps are inserted at block 802 at the beginning of execution. However, the optimizer might alternatively insert one or more traps in each target program segment at each exit point thereof immediately before the segment is to be executed (if not previously inserted), thereby avoiding the need to insert traps in program segments which are never executed. Furthermore, although inserting traps is disclosed herein as an exemplary embodiment, there are alternative techniques by which a dynamic binary optimizer may gain control of the processor. For example, some systems use periodic interrupts to sample the program counter and decide when to optimize a segment of code. Alternatively, there may be hardware assists to help gather branch traces and invoke the optimizer.

Typically, the dynamic binary optimizer does not generate any persistent optimized code which survives the user process which caused it to be generated. Depending on the implementation of the dynamic binary optimizer, it is possible for a single user process to execute the program multiple times and to re-use the optimized code generated during a previous execution. However, once the user process dies, the optimizations are not saved. This is the nature of dynamic binary optimization. If the previously compiled program is subsequently executed again using the dynamic binary optimizer in a different user process, the optimizer will typically begin anew with the program as statically compiled at block 603 and built at block 604, without the benefit of any previous optimizations made in a previous user process.

Although a specific sequence of operations is illustrated in the flow diagrams and described in the accompanying text, it will be appreciated that some operations could be performed in a different order, that some operations need not be performed, and that other operations may be performed instead, consistent with the present invention.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in non-transitory computer-readable media, and the invention applies equally regardless of the form of distribution. Examples of non-transitory computer-readable media include, but are not limited to, volatile and non-volatile memory devices, floppy disks, hard-disk drives, CD-ROM's, DVD's, and magnetic tape, it being understood that these examples are not exhaustive. Examples of non-transitory computer-readable media are illustrated in FIG. 1 as system memory 102 and data storage devices 125-127.

Unless inconsistent with the invention or otherwise qualified herein, computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a specific embodiment of the invention has been disclosed along with certain alternatives, it will be recognized by those skilled in the art that additional variations in form and detail may be made within the scope of the following claims:

The invention claimed is:

1. A computer-implemented method for executing a target program in a computer system, comprising:
compiling code of said target program for execution on a computer system to produce an executable target program, said executable target program being compiled from a non-executable version of said target program, said executable target program comprising a first set of processor-executable instructions;
associating aliasing information with said executable target program, said aliasing information identifying, for each of a plurality of instructions of said first set, a corresponding subset of one or more instructions of said first set which may reference the same memory location as the respective instruction, said aliasing information being derived from said non-executable version of said target program;
executing said executable target program with a dynamic binary optimizer, said dynamic binary optimizer accessing said aliasing information to generate a second set of processor-executable instructions of said target program, said second set including at least one instruction not contained in said first set, said second set replacing said first set to perform at least one optimization of said executable target program during execution.

2. The method of claim 1, wherein said aliasing information identifies, for each memory reference instruction of a set of memory reference instructions contained in said target program, whether other memory reference instructions of said set may reference a memory location referenced by the respective memory reference instruction.

3. The method of claim 2, wherein said aliasing information comprises a may-alias bit matrix, each row of said may-alias bit matrix corresponding to a respective memory reference instruction of said set of memory reference instructions, each column of said may-alias bit matrix corresponding to a respective memory reference instruction of said set of memory reference instructions, wherein a cell at an ith row and jth column of said may-alias bit matrix indicates whether the memory reference instruction corresponding to the ith row may reference the same memory location as the memory reference instruction corresponding to the jth column.

4. The method of claim 1, wherein said at least one optimization performed by said dynamic binary optimizer comprises re-ordering at least some memory reference instructions within said code of said target program.

5. The method of claim 1, wherein compiling code of said target program comprises compiling from an intermediate source code representation.

6. The method of claim 1, wherein compiling code of said target program comprises compiling from a source code representation.

7. The method of claim 1, wherein executing said executable target program with a dynamic binary optimizer comprises inserting a plurality of traps in said target program, each trap encountered during execution of said target program causing a respective context switch to said dynamic binary optimizer.

8. The method of claim 1, wherein said aliasing information is contained in at least one data structure embedded in at least one executable code module of said target program.

9. A computer program product for compiling a target program for execution on a computer system, comprising:
a non-transitory computer-readable medium having computer usable program code embodied therewith, the computer usable program code being configured to:
receive a non-executable version of a target program to be compiled for execution on a computer system processor;
generate compiled processor-executable code of said target program comprising a first set of processor-executable instructions;
generate at least one data structure containing aliasing information associated with said target program, said aliasing information identifying, for each of a plurality of instructions of said first set, a corresponding subset of one or more instructions of said first set which may reference the same memory location as the respective instruction, said aliasing information being derived from said non-executable version of said target program, said at least one data structure being generated in a form accessible to a dynamic binary optimizer which executes said compiled processor-executable code of said target program, said dynamic binary optimizer accessing said aliasing information to generate a second set of processor-executable instructions of said target program, said second set including at least one instruction not contained in said first set, said second set replacing said first set to perform at least one optimization of said compiled processor-executable code of said target program during execution thereof.

10. The computer program product of claim 9, wherein said aliasing information identifies, for each memory reference instruction of a set of memory reference instructions contained in said target program, whether other memory reference instructions of said set may reference a memory location referenced by the respective memory reference instruction.

11. The computer program product of claim 9, wherein said computer usable program code of said computer program product is executable on said processor.

12. The computer program product of claim 9, wherein said at least one data structure containing said aliasing information is embedded in at least one executable code module of said target program produced by said compiler.

13. A computer program product embodying a dynamic binary optimizer for executing a target program on a computer system, comprising:
a non-transitory computer-readable medium having computer usable program code embodied therewith, the computer usable program code being executable on a processor of said computer system and being configured to:
receive an executable version of a target program to be executed on said processor of said computer system, said executable version of said target program being generated from a non-executable version of said target program and comprising a first set of instructions executable on said processor and having associated therewith aliasing information, said aliasing information identifying, for each of a plurality of instructions of said first set, a corresponding subset of one or more instructions of said first set which may reference the same memory location as the respective instruction, said aliasing information being derived from said non-executable version of said target program;
cause at least some instructions of said first set of instructions of said target program to be executed on said processor;
interrupt execution of said instructions of said target program on said processor at least one time during execution of said target program to perform at least one optimization operation, wherein said at least one optimization operation comprises using said aliasing information to generate a second set of instructions of said target program executable on said processor, said second set including at least one instruction not contained in said first set, said second set replacing said first set to perform at least one optimization of said target program; and
resume execution of said target program causing at least some instructions of said second set of instructions of said target program, not contained in said first set of instructions, to be executed.

14. The computer program product of claim 13, wherein said aliasing information identifies, for each memory reference instruction of a set of memory reference instructions contained in said target program, whether other memory reference instructions of said set may reference a memory location referenced by the respective memory reference instruction.

15. The computer program product of claim 13, wherein said at least one optimization performed by said dynamic binary optimizer comprises re-ordering at least some memory reference instructions within said target program.

16. The computer program product of claim 13, wherein said dynamic binary optimizer inserts a plurality of traps in said target program, each trap encountered during execution of said target program causing a respective context switch to said dynamic binary optimizer to interrupt execution of said instructions of said target program.

17. The computer program product of claim 13, wherein said aliasing information is contained in at least one data structure embedded in at least one executable code module of said target program.

18. A computer system, comprising:
at least one processor;
a memory;
a dynamic binary optimizer executable on said at least one processor for executing executable versions of corresponding target programs on said at least one processor, each said executable version of a target program being generated from a respective non-executable version of the corresponding target program and comprising a respective first set of instructions executable on said at least one processor and having associated therewith respective aliasing information, the respective aliasing information identifying, for each of a plurality of instructions of each respective first set of instructions, a corresponding subset of one or more instructions of the respective first set of instructions which may reference the same memory location as the respective instruction, said aliasing information being derived from not including processor-executable instructions and being derived from the respective non-executable version of the corresponding target program;
wherein said dynamic binary optimizer interrupts execution of the respective instructions of each said target program on said at least one processor at least one time during execution of the respective target program to perform at least one optimization operation, wherein said at least one optimization operation comprises using said aliasing information to generate a respective second set of instructions of the respective target program executable on said processor, the respective second set of the respective target program including at least one instruction not contained in the respective first set of the respective target program, the respective second set replacing the respective first set to perform at least one optimization of the respective target program; and
wherein said dynamic binary optimizer resumes execution of each said target program causing at least some instructions of the respective second set of instructions of the respective target program, not contained in the respective first set of instructions, to be executed.

19. The computer system of claim 18, wherein said aliasing information identifies, for each memory reference instruction of a respective set of memory reference instructions contained in the target program, whether other memory reference instructions of the respective set may reference a memory location referenced by the respective memory reference instruction.

20. The computer system of claim 18, wherein said at least one optimization performed by said dynamic binary optimizer comprises re-ordering at least some memory reference instructions within the respective target program.

21. The computer system of claim 18, wherein said dynamic binary optimizer inserts a respective plurality of traps in each said target program, each trap encountered during execution of the respective target program causing a respective context switch to said dynamic binary optimizer to interrupt execution of the respective instructions of the respective target program.

22. The computer system of claim 18, wherein said aliasing information is contained in at least one data structure embedded in at least one executable code module of the corresponding target program.

23. The computer system of claim 18, further comprising a compiler executable on said at least one processor for generating said instructions executable on said at least one processor of said target programs and associating with each said target program the respective aliasing information.

* * * * *